United States Patent [19]
Lind et al.

[11] Patent Number: 4,521,963
[45] Date of Patent: Jun. 11, 1985

[54] HYDRAULIC CABLE AND ROD CUTTING AND CRIMPING DEVICE

[75] Inventors: Michael A. Lind, Salt Lake City; Michael R. Dunn, Sandy, both of Utah

[73] Assignee: New Draulics, Inc., Salt Lake City, Utah

[21] Appl. No.: 426,014

[22] Filed: Sep. 28, 1982

[51] Int. Cl.³ .............................................. B23D 21/10
[52] U.S. Cl. ...................................... 30/92; 29/283.5; 30/180; 30/228; 30/272 A; 72/453.16; 91/224; 91/229; 137/635; 251/116; 294/88; 294/117
[58] Field of Search ............... 30/92, 180, 187, 272 R, 30/272 A, 210, 228, 246; 83/639; 72/453.02, 453.03, 453.16; 29/237, 283.5, 283; 294/88, 117; 251/116; 137/635, 69; 91/229, 224; 7/15 T

[56] References Cited

U.S. PATENT DOCUMENTS

| | | | |
|---|---|---|---|
| 876,068 | 1/1908 | Lau | 30/187 X |
| 2,446,011 | 7/1948 | Johnson | 30/228 X |
| 3,922,782 | 12/1975 | Lind | 30/228 |
| 4,106,194 | 8/1978 | Steed | 30/228 |

FOREIGN PATENT DOCUMENTS 3028370 2/1982 Fed. Rep. of Germany .......... 30/92

Primary Examiner—Douglas D. Watts
Attorney, Agent, or Firm—Lynn G. Foster

[57] ABSTRACT

A novel hydraulic tool used to cut cables, rods, bars and the like or crimp various items such as cable connectors and which is operated manually and with ease by a single man. The improved cable cutting hydraulic tool comprises dual manually held handles which centrally receive and exhaust the operating pressurized hydraulic fluid, a safety trigger assembly which prevents the inadvertent closing of the cutting or crimping jaws, and an operating trigger assembly, a control valve which directs and redirects the flow of hydraulic fluid under pressure, and a piston cylinder assembly which relatively reciprocates to displace operating rods which in turn causes the cutting jaws to close and open by rotation about a pivot pin.

1 Claim, 11 Drawing Figures

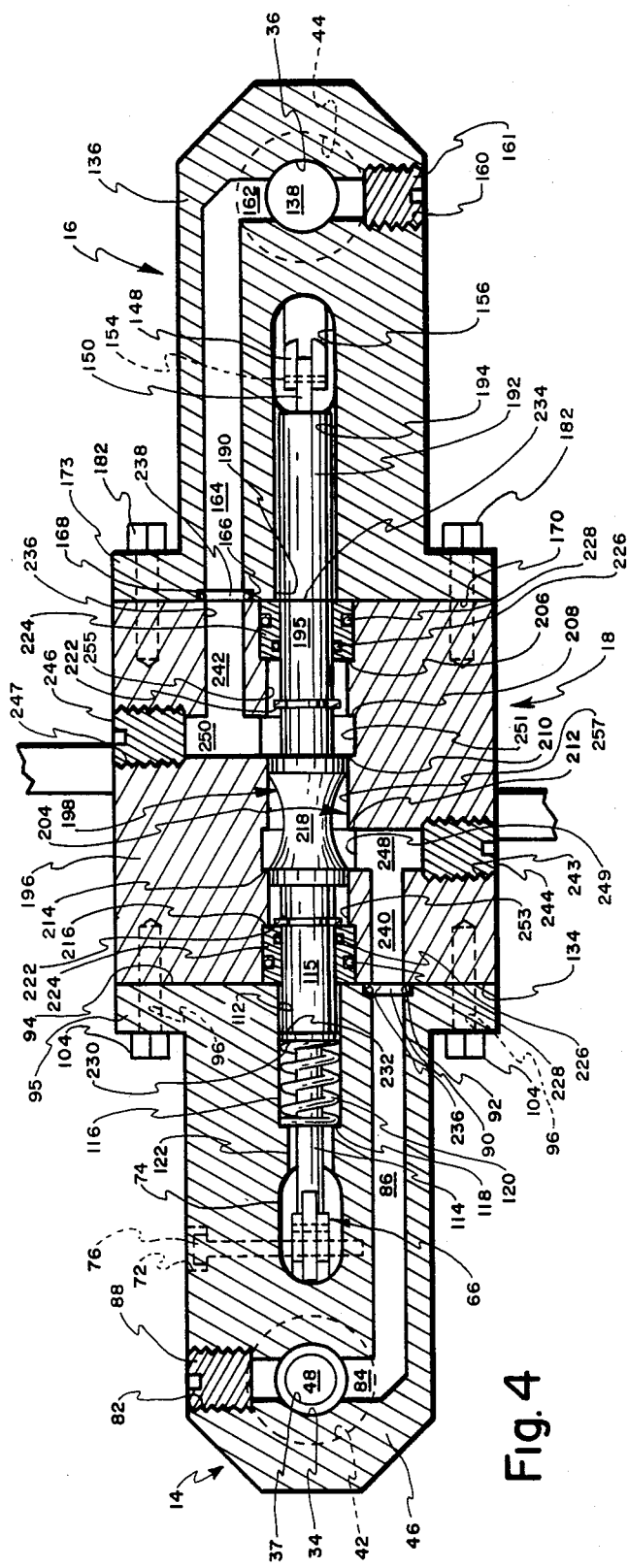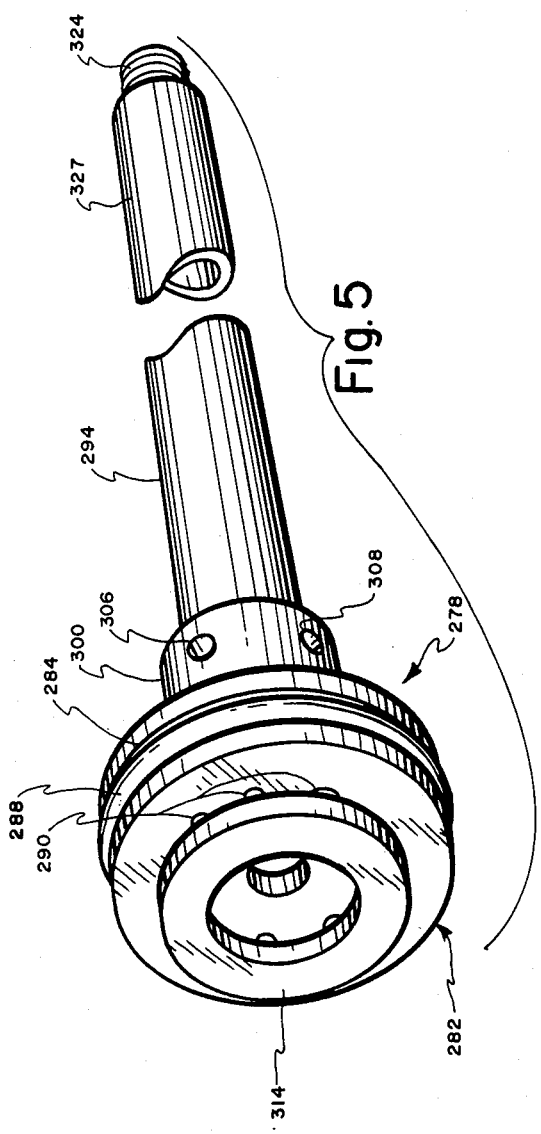

– 4,521,963 –

HYDRAULIC CABLE AND ROD CUTTING AND CRIMPING DEVICE

BACKGROUND

1. Field of Invention

The present invention relates generally to the field of cutting or crimping instruments, and more particularly to a novel manually controlled hydraulically driven tool for cutting cables, rods, bars and the like and for crimping various items.

2. Prior Art

Prior art hand held, hydraulic cutters and crimpers known to the Applicant comprise closed hydraulic systems comprising a cylinder assembly wherein the piston rod is extended to close the cutting or crimping jaws. Thus, the overall length of such devices is substantial, making use awkward and cumbersome.

Generally, these prior art devices required a smaller cylinder bore which adds to the excess length problem, provoking further awkwardness.

Also, such devices generally comprise a single site for manually manipulating the device and a single trigger for activation of the jaws. External valving in the vicinity of the single handle site and activation trigger has proved to be, at times, confusing, awkward and dangerous.

Lack of effective insulation on and around the handle site of the device results in heat being transferred to the device from the operating fluid which makes the device uncomfortable and, at times, impossible for the user to hold.

The pressure and force levels existing during cutting and crimping is often far in excess of that needed, reducing the useful life of the tool and increasing maintenance costs. These problems are accentuated because, once the cutting stroke is complete, the actuating components of the cutter remain under high pressure until the user manually relieves the high pressure.

BRIEF SUMMARY AND OBJECTS OF THE INVENTION

In brief summary, the present invention features a manually controlled hydraulic cutting and/or crimping apparatus comprising a cylinder-piston assembly disposed between a main operating rear bracket and a forward valve housing, which valve housing is generally situated immediately to the rear of the cutting or crimping jaws. A large cylinder bore provides increased force and contributes to a remarkably compact and easily manageable apparatus heretofore not feasible. The apparatus is handled comfortably and facilely manually manipulatable to provide surprising control and safety during use.

Dual control handles, each associated with a trigger housing assembly, are located parallel with but eccentric to the cylinder. Excessive length is thus eliminated and improved tool balance and control are achieved. The handles are designed with an annular dead air space between the fluid flow pathway therein and the grip of each, which prevents significant heat transfer from the fluid to the grip thereby increasing operator comfort during use and lengthening the time of use.

Activation of two triggers (a safety trigger and an operating trigger) is a necessary precondition to blades or jaw actuation. This safety feature necessitates triggering of the device by the operator using both hands.

The hydraulic system itself comprises a double acting, self relieving or closed system with internal valving. There is no need for external valving because when the piston assembly displaces fully against either the valve housing base or the cylinder end cap, the pressure on both sides of the piston annulus is automatically equalized. Due to the valve stem design and piston function, the valve stem seals are always under essentially the same fluid pressure as that in the return or effluent line.

Whenever the operating trigger is released the cutting or crimping jaws are automatically returned to their initial open position.

With the foregoing in mind, it is a primary object of the present invention to provide a novel cutter or crimper and related methods.

It is also a principal object of the present invention to provide an improved cutter or crimper which has dual balanced controls.

It is a further significant object to provide a cutter or crimper having insulated handles and a cylinder piston assembly located between the handles which decrease the overall length and improves tool balance and control.

It is a further important object to provide a novel cutter or crimper and related methods, whereby actuators are located adjacent to the handles and operation of the mechanism requires the simultaneous actuation of more than one actuator.

It is a paramount object of the present invention to provide a novel cutter or crimper comprising a double acting self relieving cylinder with internal forward valving used whereby pressure is applied to the actuating components only during reciprocation and when the operating trigger is disengaged and the cutting or crimping jaws automatically returned to an open, at rest position.

Another principal object of the present invention is to provide a novel cutter or crimper and method whereby the pressure on the valve stem seals is always essentially the same as the pressure in the return or effluent line thereby facilitating reciprocation of the valve stem and spool during operation.

It is a further important object of the present invention to provide a novel cutter or crimper whereby an increased cylinder bore accommodates smaller overall cutting or crimping jaws.

These and other objects and features of the present invention will be apparent from the following detailed description taken with reference to the accompanying drawings.

BRIEF DESCRIPTION OF THE DRAWINGS

FIG. 4 is a cross-sectional view taken along the lines 4—4 of FIG. 1;

FIG. 5 is a perspective representation of the piston and piston rod assembly of the mechanism of FIG. 1;

DETAILED DESCRIPTION OF THE ILLUSTRATED EMBODIMENTS

Figure 1:
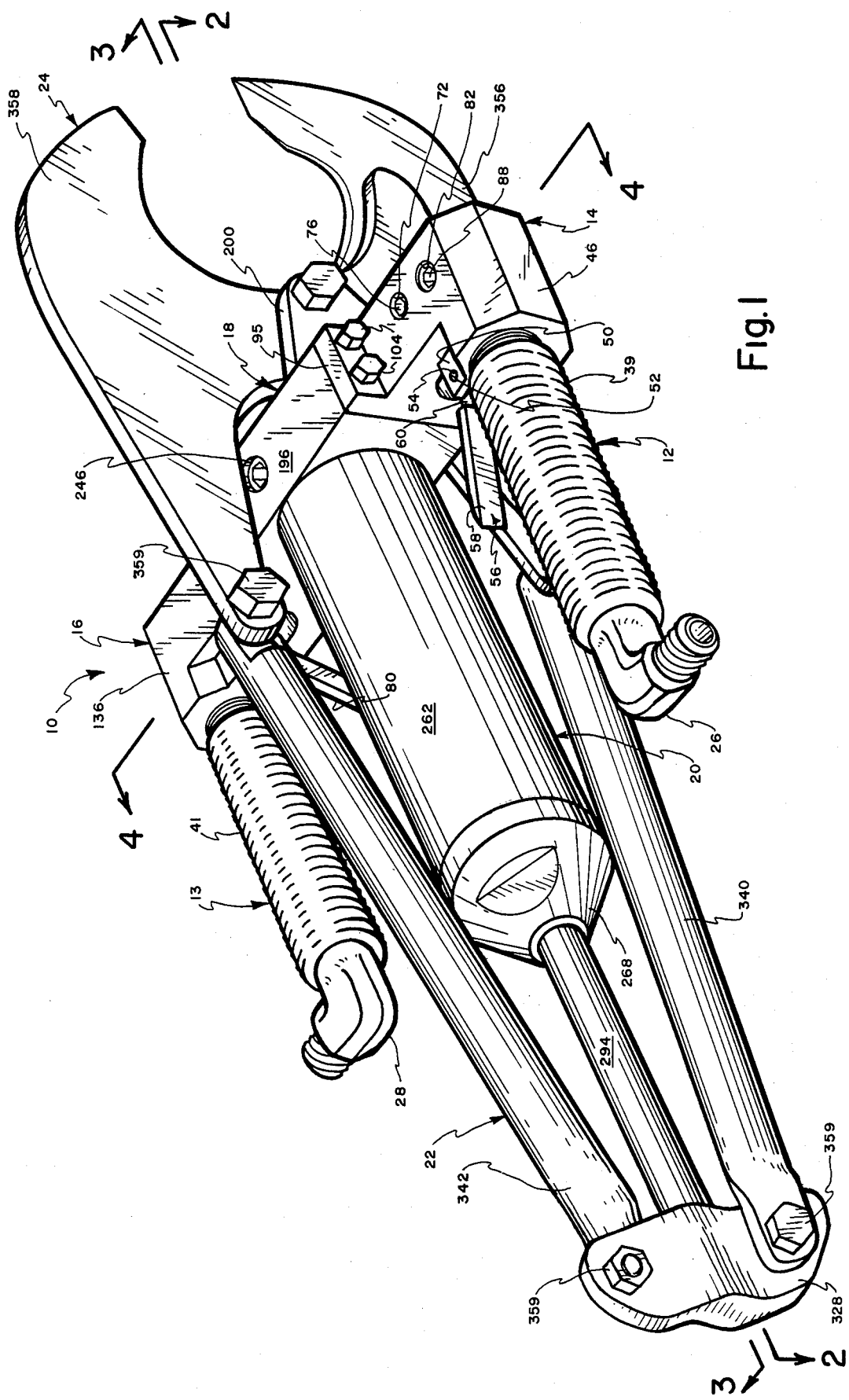
FIG. 1 is an enlarged perspective representation of a presently preferred cutting mechanism in accordance with the present invention.

Reference is made to the Figures specifically, wherein like numerals are used to designate like parts throughout. FIG. 1 illustrates in perspective an improved cable cutter, generally designated 10, which comprises manual handle assemblies 12 and and 13, a safety trigger assembly 14, an operating trigger assembly 16, a control valve 18, a piston-cylinder 20, an operating rod or bracket assembly 22, and a cutting mechanism 24.

Figure 2:
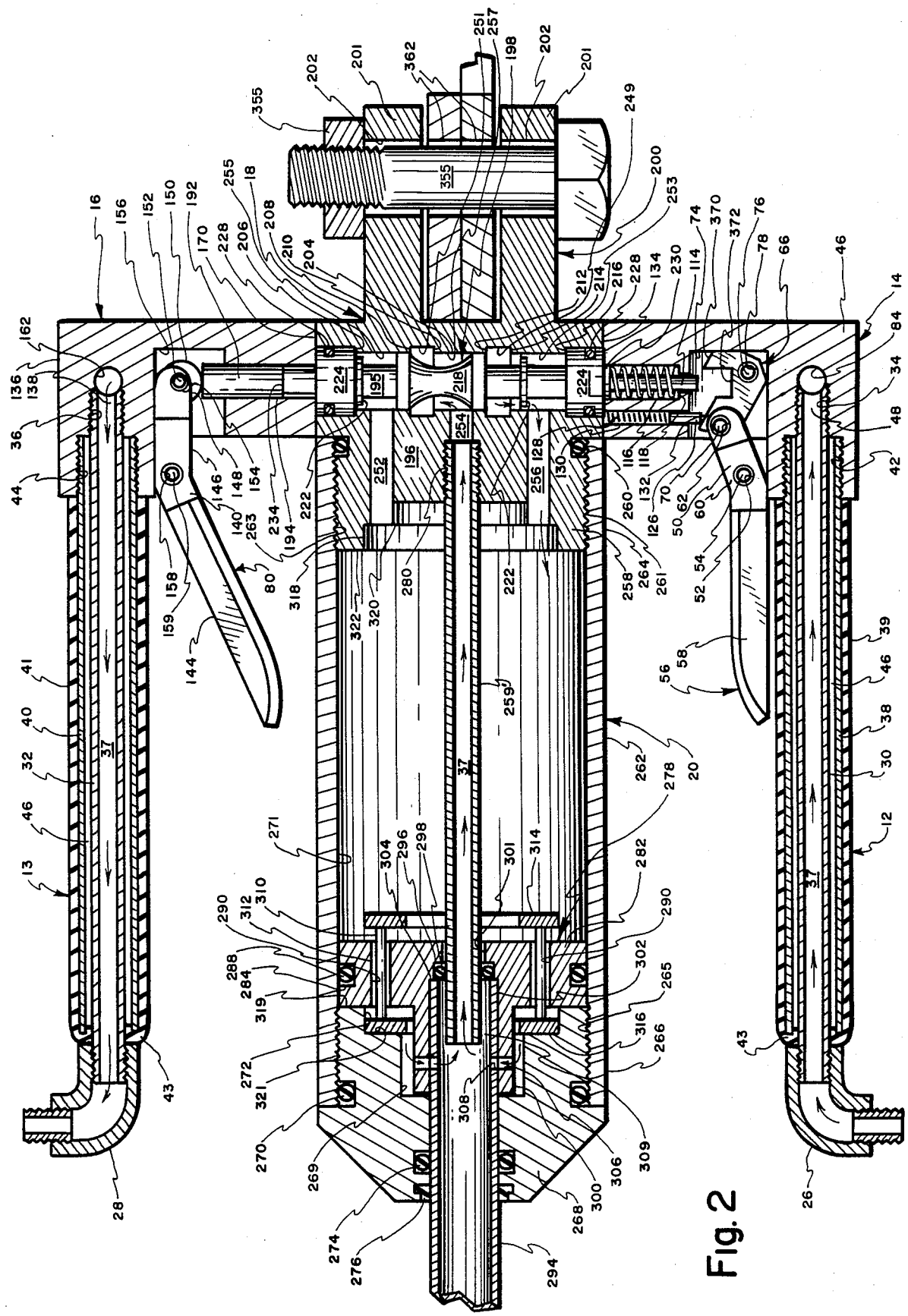
FIG. 2 is a cross-sectional view taken along lines 2—2 of FIG. 1.
Figure 3:
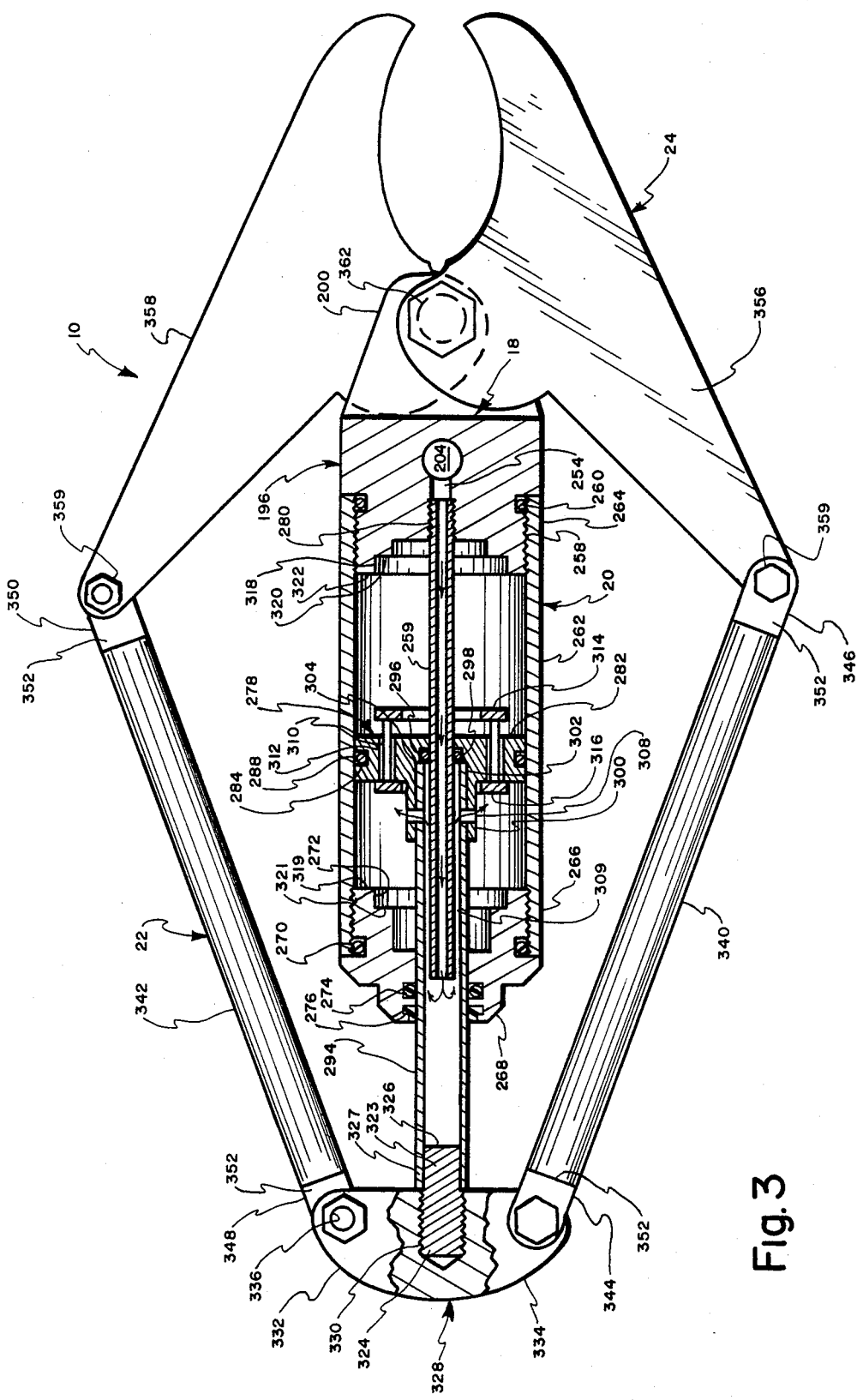
FIG. 3 is a side elevation view with the cylinder assembly broken away for clarity.

With reference to FIG. 2, handle assemblies 12 and 13 comprise 90 degree threaded hollow elbows 26 and 28 which threadedly receive hollow pipe sections 30 and 32 at the exterior or distal end. See FIG. 2.

Trigger assemblies 14 and 16 comprise threaded recesses 34 and 36 which respectively threadedly receive the interior ends of pipe sections 30 and 32.

Hollow tubular handles 38 and 40 are threadedly secured at threaded recesses 42 and 44 to the trigger assemblies 14 and 16. Handles 38 and 40 are of such a diameter to internally concentrically receive pipe sections 30 and 32 in spaced relation thereby defining an annular air space 46 which serves to insulate the handles 38 and 40 from the sometimes hot hydraulic fluid flowing through the hollow 37 of pipe sections 30 and 32.

Grips 39 and 41 are frictionally though slidably located around the exterior surface of handles 38 and 40 and are in the nature of bicycle handle grips except for the overlapping distal ends at 43. Grips 39 and 41 provide comfortable and secure areas where the operator grasps and manually controls the cutter or crimper 10.

Safety trigger assembly 14 is always located on the influent side of the cable cutter 10. Safety trigger assembly 14 comprises a safety trigger metal housing 46, which is generally an L-shaped, unitary part. The intake section of housing 46 is generally hexagonal (FIG. 1) and comprises a main influent bore 84 in fluid communication with the hollow interior 37 of pipe 30. The intake section also comprises a clevis 50 which has a traverse aperture 52 wherein roll pin 54 is force fit to secure safety trigger 56. Safety trigger 56 comprises an elongated handle 58 and an angularly displaced operating lever 60. Operating lever 60 is clevised with aperture 62 traversing said clevis and aperture 52 located at the point of angular displacement of the handle 56. Roll pin 54 passes slidably through aperture 52 to provide a hinge point for safety trigger 56.

Safety toggle 66 is located within the clevis of operating lever 60 with a force fit roll pin 70 securing safety toggle 66 in place. Threaded aperture 72 (FIG. 1) passes through the side of trigger housing 46, through recess 74, and partially into the lower wall of trigger housing 46. Aperture 72 is recessed so that set screw 76 does not project beyond the trigger housing 46. Screw 76 is centrally smooth and slidably passes through aperature 78 of safety toggle 66 and provides a pivot point for the safety toggle. Displacement of safety trigger 56 from its normal at rest position to its actuated position will cause safety toggle 66 to pivot in such a manner to allow valve spool 218 to be displaced by operation of the operating trigger 80.

Threaded opening 82 is a continuation of bore 84 incurred during fabrication of bores 84. Aperture 82 is closed by threaded set screw plug 88. Bore 84 is in fluid communication with bore 86 (FIG. 4). Bore 86 terminates at stepped port 90 which has a diameter which accommodates placement of O-ring 92 to prevent leakage of influent at interface 94.

Figure 7A:
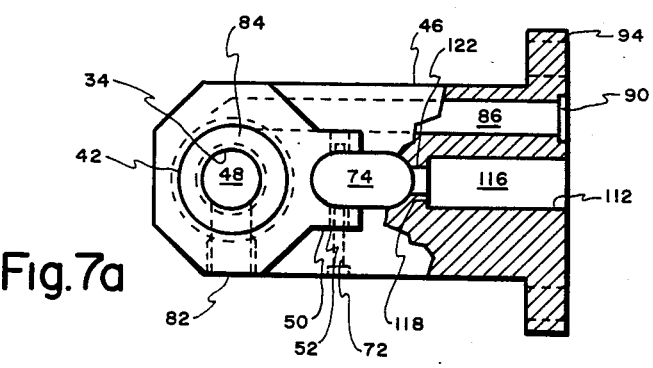
FIGS. 7a, 7b, and 7c illustrate three views of an effluent elbow of the mechanism of FIG. 1.
Figure 7B:
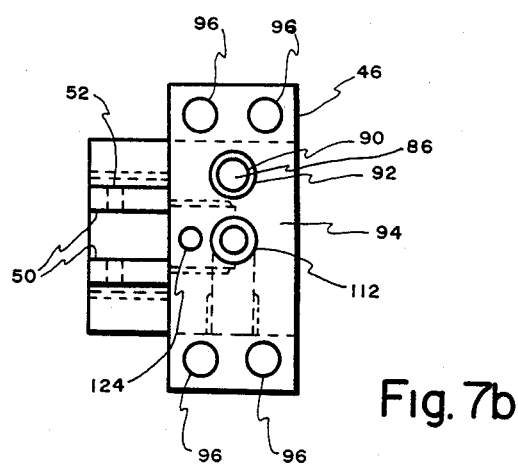
Figure 7C:
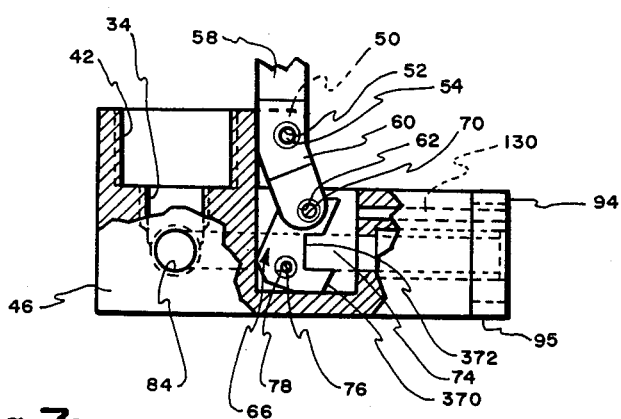

Face 94 comprises part of housing flange 95 which comprises seven apertures or bores the function of which will be more fully described hereinafter. Stepped port 90 has been already been described as the terminal point of bore 86. Four apertures 96 allow screws 104 to slidably pass therethrough the threaded end of each screw 104 being anchored to the control valve housing. Opening 112 allows valve stem 114 access to and reciprocation within bore 116. See FIGS. 4 and 7a. Bore 116 is stepped at shoulder 118 to provide an abutment for compression spring 120. Reduced diameter passageway 122 allows valve stem end 114 to slidably pass therethrough and contact safety toggle 66. Aperture 124 (FIG. 7b) reciprocably receives return rod 126 and spring 128 into bore 130. Plug 126 abuts on edge 132 of safety toggle 66 and transmits a return force (imposed by compression spring 128). Spring 128 abuts on valve housing face 134, to effectively urge safety trigger 56 toward its disabled position which position prevents the inadvertent operation of cable cutter 10.

Figure 6A:
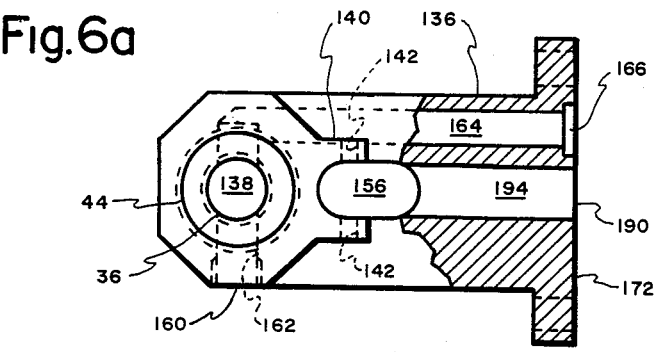
FIGS. 6a, 6b, and 6c illustrate three views of an influent fluid control elbow of the embodiment of FIG. 1.
Figure 6B:
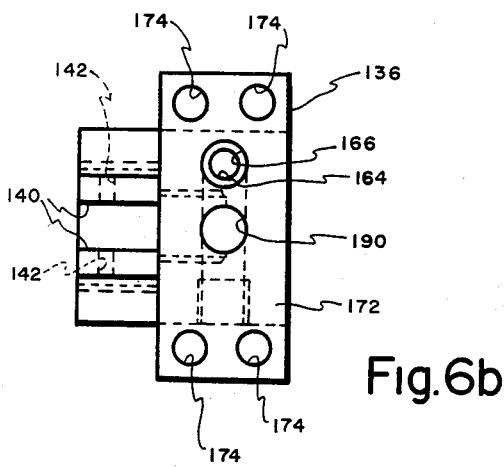
Figure 6C:
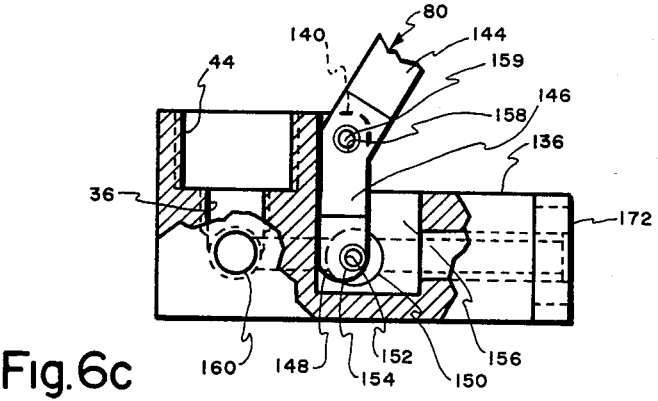

Trigger assembly 16 comprises an L-shaped trigger housing 136, which is generally of the same dimensions as previously described safety trigger housing 46. The outlet portion of trigger housing 136 is generally exteriorly hexagonal and internally comprises bore 138, which is in fluid communication with passageway 37 of pipe 32. The upper portion of housing 136 is clevised at 140 (FIGS. 6a and 6b) and apertures 142 traverse clevis 140. Trigger 80 is generally of the same dimensions as described safety trigger 56 and comprises handle 144 and an angularly disposed operating lever 146 the end of which is pivotably clevised at 158.

Roller 150 is secured within clevis 148 by a roll pin 152, force fit at apertures 142, which pin also passes slidably through traverse aperture 154 centrally located in roller 150. Roller 150 is disposed within recess 156 of trigger housing 136 between the flanges of the clevis 148.

Aperture 158 is located along the line of angular displacement of trigger 80 and it is secured within clevis 140 by roll pin 159 which pin is force fit into apertures 142 and loosely passes through aperture 158. Bore 138 is in fluid communication with bore 162 in housing 136, the end of bore 162 being closed by threaded plug 161 connected at threaded port 160 (FIG. 4). Bore 162 is in fluid communication with bore 164. Bore 164 terminates at stepped port 166 which is recessed or enlarged to allow the placement of an O-ring 168 which prevents leakage of effluent at housing face 172.

Trigger housing face 172 extends to flange 173 and comprises six apertures or openings. Port 166 has already been described as the entry point of effluent into bore 164 from control valve 18. Four apertures 174 merely allow screws 182 to slidably pass to secure trigger housing 136 to control valve 18 by threaded engagement with housing of control valve 18.

Blind bore 190 allows the insertion of valve pin 192 into bore 194, said valve pin directly contacting roller 150. When trigger 80 is actuated roller 150 slidably displaces valve pin 192 from the position of FIG. 2 to that of FIG. 4 so that the distal end abuts valve stem 195.

The control valve 18 comprises a valve housing 196 and a valve spool, generally designated 198 (FIG. 2).

Valve housing 196 is generally cubical in shape and comprises a large exposed clevis 200. Clevis 200 comprises two flanges 201 each of which comprises a traverse aperture 202. The two transverse apertures 202 are aligned to operatively receive the cutting mechanism 24, as herein explained. Valve housing 196 is a unitary, symmetrical, machined part comprising a plurality of ports and bores through which influent and effluent fluid flows and into which the valve stem 198 is reciprocably disposed. Spool receiving main bore 204 comprises a plurality of steps disposed at shoulder sites 206, 208, 210, 212, 214 and 216. See FIG. 4. Bore 204 is aligned with bores 194 of trigger housing 136 and 116 of safety trigger housing 46 and all three of which accommodate receipt and reciprocation of valve spool 198.

Valve spool mechanism 198 is integral with valve stem 195, and stepped valve stem 114, 115. Valve spool mechanism 198 also comprises central spool 218. Valve stem 195 has machined grooves which accommodate retaining rings 222. Valve stem plugs or bushings 224 are pressed into housing 196 and sizably receive valve stems 195 and 115, respectively. Each bushing 224 has an internal O-ring 226 and an external O-ring 228 which prevent inadvertent and undesired leakage of fluid from bore 204. Washer 230 is placed on stepped edge 232 to provide an abutment for compression spool return spring 120, the distal end of compression spring 120 abutting step 118 of safety trigger housing 46 as previously described. In the at-rest position central spool 218 is located as shown in FIG. 2. Compression spring 120 forces valve spool mechanism 198 toward operating trigger assembly 16 and end 234 is contiguous with valve pin 192 which in turn contacts roller 150 of operating trigger 80. Bushings 224 fit within bore 204 between trigger housing faces 94 and 172 and shoulders 206 and 216, respectively.

Valve housing 196 comprises four threaded blind bores on face 134 and four similar threaded bores on face 170 which threadedly receive screws 104 and 182, respectively, to secure the trigger housings 46 and 136 to valve housing 196 in the illustrated configuration. Faces 134 and 170 comprise ports 236 and 238 which provide for fluid communication between bores 86 and 240 and 164 and 242, respectively.

Bore 240 is in fluid communication with transverse bore 248, one end of which is closed by threaded plug 244 secured in threaded port 243.

Bore 242 is in fluid communication with transverse bore 250, one end of which is closed by threaded plug 246 secured in threaded port 247.

Bore 248 is in fluid communication with chamber 249 of main bore 204 (between shoulders 212 and 214). Bore 250 is in fluid communication with chamber 251 of main bore 204 (between shoulders 208 and 210). Chamber 249 is in selective fluid communication with main bore chamber 253 and communication 251 with main bore chamber 255, depending on the location of spool 218. See FIG. 4.

Chambers 249 and 251 are respectively in selective fluid communication with central main bore chamber 257.

With reference to FIG. 2, valve housing 196 extends into and is interiorly secured to the cylinder wall of the cylinder piston assembly 20. This extension comprises spaced transverse passageways 252, 254 and 256, which are respectively in fluid communication with chambers 255, 257 and 253. Passageways 252 and 256 are respectively in fluid communication with the cylinder bore, while passageway 254 is in fluid communication with the hollow of the piston rod, for purposes later to be explained.

Passageway 254 is enlarged and partially threaded at 280 to receive tube 259′, the function of which will be more fully described hereinafter. The cylinder extension 258 of valve housing 196 is annular and externally threaded at 261 to receive cylinder 262 at internal cylinder threads 263, with O-ring 260 providing a seal against fluid leakage.

The piston cylinder assembly 20 comprises a cylinder 262 in the form of a rigid sleeve comprising ends 264 and 266. The distal end of cylinder 262 threadedly receives (at site 265) end cap 268, an O-ring 270 sealing the threaded connection against fluid leakage. End cap 268 comprises an internal central blind bore 269 which is stepped at 272 to facilitate operation of the piston assembly, which will be more fully described hereinafter. Seal 274 and a dust guard 276 are provided in the nose of end cap 268 to prevent fluid leakage and dirt influx, respectively.

An annular piston assembly 278 reciprocates along the inside surface 271 of the cylinder 262, in a manner and for purposes hereinafter more fully explained. The reciprocation is also in respect to a stationary center cylindrical tube 259′, one end of tube 259′ being telescopically secured at threads 280 to valve housing 196.

The piston assembly 278 comprises a stepped generally annular body 282 having an annular groove 284 in which an O-ring 288 is disposed such that the body 282 fits snugly though slidably against the interior surface 271 of the cylinder 262 and the O-ring 288 prevents fluid transfer between the circumference of the body 282 and the interior surface 271 of the cylinder 262.

The body 282 comprises a plurality of longitudinally directed through bores 290, for selective fluid communication in a manner and for purposes hereinafter explained.

The hollow interior 301 of body 282 is stepped first at 296 and also at 304 so that, when piston rod 294 is force fit in place, an annular chamber 309 is created. A T-seal 298 is placed snugly at shoulder 296 to seal chamber 309 against the exterior surface of tube 259′ and the end 302 of the hollow piston rod 294.

Hollow piston rod 294 is press fit inside annulus 300 of body 282 until end 302 abuts against stepped edge 304. Piston rod 294 is preferably thereafter welded into place and aligned pairs of apertures 306 and 308 are simultaneously drilled completely through the annulus 300 and piston rod 294.

A spacer rod 310 is slidably disposed in each longitudinal bore 290. The ends of each rod 310 are respectively secured to front and rear surfaces of rings 314 and 316. Rings 314 and 316 are thus jointly reciprocated in respect to the body 282, left or right to selectively close the bores 290, in a manner later to be described.

It is to be appreciated that the interior opening of base 258 of valve housing 196 is stepped at 318 and defines a shoulder 320 to allow the ring 314 to be displaced, bottoming out on the shoulder 320 as the body 282 engages the shoulder 322, the longitudinal distance between the shoulders 320 and 322 insuring displacement of the rings 314 and 316 from a closed to an open position. End cap 268 is similarly stepped at 272 to accommodate ring 316 so that as body 282 engages shoulder 319, shoulder 321 will cause rings 314 and 316 to shift from a closed to an open position.

The piston rod connector 323 comprises a threaded end 324 and a reduced diameter plug 326 which is inserted internally into end 327 of piston rod 294 and welded into place in such a way as to prevent fluid leakage. End 324 threadedly engages pivot lug 328 at threaded recess 330.

Operating rod section 22 comprises the mentioned pivot lug 328 and two diagonally disposed bracket rods 340 and 342. Lug 328 also comprises two offset flanges 332 and 334. Apertures 336 are located in flanges 332 and 334 respectively, the central lines of which are perpendicular to threaded blind bore 330.

Rods 340 and 342 preferably comprise annular pipe sections with reinforced ends 344, 346, 348 and 350 interiorly placed and secured, as by welding, within the hollow ends of operating rods 340 and 342. The extending end 352 of reinforcing ends 344, 346, 348 and 350 is generally flat with aperture 354 being drilled to provide means where rods 340 and 342 are pivotably bolted to pivot lug 328 at apertures 336 and to cutting jaws 356 and 358 at apertures 354, using conventional nut and bolt assemblies 359.

Cutting jaws 356 and 358 are illustrated as being of the standard type used for cutting cable. Each jaw has an aperture where the cutting jaw is rotatably connected to an operating rod 340 or 342 with the mentioned nut and bolt assemblies at rod ends 350 and 352. Clevis 200 centrally receives the overlapping portions of jaws 356 and 358 which are apertured at 362 (FIG. 2) in alignment with aligned aperture 202 of clevis 200. With both jaws in place, a bolt 353 is slidably located through apertures 202 and 362 and the jaws rotate on said bolts which are secured in this position by a lock nut 355.

The cable cutter 10 is ready for operation as soon as pressurized fluid influent is connected at elbow 26 and a return hose is connected at elbow 28.

In the normal at rest position of the cable cutter 10 the jaws 356 and 358 are in an open position and remain in such open position until both the safety trigger 56 and the operating trigger 80 are manually actuated. The initial position of the piston assembly 278 is to the rear of cylinder 262 (as shown in FIG. 2) with piston body 282 abutting shoulder 319 and ring 316 resting on shoulder 321 of end cap 268.

Influent fluid flows through the hollow 37 of pipe section 30 and enters the safety trigger housing 46 at aperture 48. The influent fluid if thence forced through bores 84 and 86. The influent continues through bores 240 and 248 into channel 257.

The at rest position as shown in FIG. 2, spool 218 forces the influent through bore 256 which terminates at shoulder 320 cause fluid to be received in the barrel of cylinder 262. The pressure from said influent fluid in the cylinder 262 forces the piston assembly 278 to move toward end cap 268, ring 314 sealing longitudinal passageways 290 through body 282 during the movement from right to left, as viewed in FIG. 2. At the end of its leftward displacement (as viewed in FIG. 2) ring 316 first engages shoulder 321 (thereby opening ports 290) and thereafter body 282 bottoms out by engagement with shoulder 319. The position of FIG. 2 is thus achieved, allowing the flow of fluid through passageways 290 and maintain an equalized fluid pressure condition within the barrel cylinder 262 and particularly on both sides of the piston body 282.

Fluid is prevented from escaping from the cylinder barrel and the valve housing 196 by reason of the blocking position of spool 218.

It should be noted that the fluid pressure within cylinder 262 and against seals 224 is relatively low (essentially the same as the effluent fluid pressure) since only low pressure required to open the cutting jaws 356 and 358 by the rearward motion of the piston assembly 278 is exerted on the interior walls of cylinder 262 and against seals 224. This is important because the higher the pressure on the valve stem seals 224, the higher the force required to move the valve stem 195 through the seals 224 resulting in greater friction and wear between stem 195 and internal O-ring 226. Lower pressure and the resultant decrease in friction between stem 195 and O-ring 226 allows more economical design of compression spring 120.

As piston assembly 278 is forced rearward by pressure on the front side of body 282, the fluid on the rear side of the body 282 is forced through apertures 306 and 308 into the hollow interior of piston rod 294 and the hollow interior 37 of pipe 259'. This fluid reaches body 254 and channel 257 in valve housing 196. As the telescopic relation between tubes 259 and 294 is extended, the fluid capacity of the piston tube 294 increases to accommodate the mentioned displacement of piston assembly 278. In the described orientation effluent fluid escapes seriatim through channels 257 and 251, bores 250, 242, 164, 162 and 138 and thence through the hollow 37 of handle pipe 32 and the hollow of elbow 28.

As mentioned previously, operating trigger 80 cannot shift valve group 198 the required distance for activation without the operator first engaging safety trigger 56. The purpose of this safety mechanism is to prevent the inadvertent closing of the cutting jaws 356 and 358.

The closing action of the jaws is, therefore, caused only when both triggers 56 and 80 are simultaneously actuated causing the piston assembly 278 to be displaced toward valve housing 196 within cylinder 262 after shifting the spool 218 from the position of FIG. 2 to that of FIG. 4. More specifically, when the safety trigger 56 is rotated toward the handle assembly 12, safety toggle 66 is rotated in such a manner as to allow valve stem 114 to move beyond surface 370 and into toggle recess 372. It is to be noted that surface 370 is that which effectively prevents the displacement of valve spool mechanism 198 when trigger 56 is in its at rest position.

After safety trigger 56 has been rotated toward handle assembly 12, operating trigger 80 may successfully be engaged in a like manner toward handle assembly 13. As operating trigger 80 is engaged, valve pin 192 is longitudinally displaced through bore 194 by roller 150. Valve pin 192 is in communication with end 234 of valve stem 195 and the displacement of valve pin 192 causes a similar displacement of valve spool mechanism 198 so that spool 218 becomes located as shown in FIG. 4. Compression spring 120 exerts force in an opposite direction to the last mentioned displacement of valve spool mechanism 198 so that when operating trigger 80 is released compression spring 120 causes valve spool mechanism 198 to return to its original at rest position.

When both safety trigger 56 and operating trigger 80 have been actuated and spool 218 disposed as shown in FIG. 4, influent fluid flows seriatim through elbow 26, tube 30, bores 48, 84, 86, 240 and 248 chambers 249 and 257 and 254 into the hollow 37 of tube 259'. This fluid further flows into the hollow of piston rod 294, and thence through apertures 306 and 308 into the space between the end cap 268 and the piston assembly 278. This fluid discharging on the back side of body 282 closes the ring 316 against body 282 to close bores 290 and then forces the piston assembly 278 forward toward extension 258 of valve housing 196.

During the last mentioned displacement of piston assembly 278, effluent fluid is forced from the front side of body 282 seriatim through bore 252 chamber 251, bores 250, 242, 164, 162 and 138. The effluent fluid thence flows through the hollow of pipe 32 and elbow 28 which is attached to the receiving end of a conventional hydraulic system. It should be noted that the fluid pressure exerted upon seals 224 is essentially the same as that of the effluent resulting in benefits hereinbefore described.

Forward displacement of the piston assembly 278 causes an identical displacement of the piston rod 294. As a result, the rods 340 and 342 of bracket section 22 are displaced in opposite lateral directions in such a manner as to cause cutting jaws 356 and 358 to rotate toward one another and perform the desired cutting or crimping action.

The rightward displacement of piston assembly 278 is concluded when ring 314 engages shoulder 320 to open bores 290 and the front face of body 282 immediately thereafter contacts shoulder 322.

As soon as operating trigger 80 is released, compression spring 120 forces valve spool 218 back to its original at rest position and the piston assembly 278 is displaced away from valve housing 196 toward end cap 268 as hereinbefore described.

Safety trigger 56 is also released and spring 128 in bore 130 causes safety trigger 56 to rotate back to its original position.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by U.S. Letters Patent is:

1. A mechanism for cutting and the like comprising:
   two way cylinder assembly means comprising interior piston means carrying piston rod means comprising an exposed portion of variable length;
   valve means by which influent and effluent fluid is selectively delivered to and removed from the cylinder assembly means;
   opposed jaw means disposed forward of the cylinder assembly means, for cutting and the like movable between open and closed positions comprising means operatively responsive to displacement of the piston rod means to displace the jaw means between said open and closed positions;
   actuating means associated with the valve means by which the flow path influent and effluent fluid is selectively controlled;
   spaced first and second spaced handle means, each handle means at least partially co-extensive with although laterally spaced from the cylinder assembly means by which the mechanism is manually held and manipulated during use;
   the actuating means comprising two trigger means, one located adjacent each handle means, both of which must be actuated for the valve means to cause the opposed jaw means to close;
   the valve means comprising flow control spool means and the two trigger means each comprising means controlling the location of the spool means and a trigger by which said controlling means are manipulated.

* * * * *